(12) United States Patent
Martins et al.

(10) Patent No.: US 6,771,834 B1
(45) Date of Patent: Aug. 3, 2004

(54) METHOD FOR SEGMENTING A DIGITAL IMAGE

(75) Inventors: Fernando C. M. Martins, Hillsboro, OR (US); Rajeeb Hazra, Beaverton, OR (US)

(73) Assignee: Intel Corporation, Santa Clara, CA (US)

( * ) Notice: Subject to any disclaimer, the term of this patent is extended or adjusted under 35 U.S.C. 154(b) by 0 days.

(21) Appl. No.: 09/347,481

(22) Filed: Jul. 2, 1999

(51) Int. Cl.$^7$ ................................................. G06K 9/34
(52) U.S. Cl. ....................... 382/257; 382/260; 382/308; 382/173
(58) Field of Search ................................. 382/173, 174, 382/178, 205, 256, 257, 260, 307, 308, 180; 358/464

(56) References Cited

U.S. PATENT DOCUMENTS

| | | | |
|---|---|---|---|
| 5,764,306 A | | 6/1998 | Steffano |
| 5,812,787 A | | 9/1998 | Astle |
| 6,301,386 B1 | * | 10/2001 | Zhu et al. ................... 382/176 |
| 6,396,949 B1 | * | 5/2002 | Nichani ....................... 382/173 |
| 6,453,069 B1 | * | 9/2002 | Matsugu et al. ............ 382/173 |

OTHER PUBLICATIONS

U.S. patent application Ser. No. 09/296,451, filed Apr. 21, 1999.
U.S. patent application Ser. No. 09/205,638, filed Dec. 3, 1998.
U.S. patent application Ser. No. 09/216,184, filed Dec. 18, 1998.
U.S. patent application Ser. No. 09/156,571, filed Sep. 17, 1998.
U.S. patent application Ser. No. 09/222,232, filed Dec. 29, 1998.
U.S. patent application Ser. No. 09/205,638, filed Dec. 3, 1998.
U.S. patent application Ser. No. 09/179,491, filed Oct. 26, 1998.
U.S. patent application Ser. No. 09/206,791, filed Dec. 7, 1998.
U.S. patent application Ser. No. 09/216,184, filed Dec. 18, 1998.
U.S. patent application Ser. No. 09/291,799, filed Apr. 14, 1999.
U.S. patent application Ser. No. 09/221,666, filed Dec. 23, 1998.
U.S. patent application Ser. No. 09/074,556, filed May 7, 1998.
U.S. patent application Ser. No. 09/502,493, filed Mar. 30, 1998.
U.S. patent application Ser. No. 09/109,571, filed Jul. 2, 1998.

(List continued on next page.)

*Primary Examiner*—Thomas D. Lee
(74) *Attorney, Agent, or Firm*—Sharon Wong (57) ABSTRACT

Briefly, in accordance with one embodiment of the invention, a method of segmenting an initial digital image includes the following. The initial digital image is processed to produce a first digital image with defined edges corresponding to the initial digital image and to produce a second digital image with at least two dominant contiguous regions corresponding to the initial digital image. Distinct non-overlapping regions of the first digital image formed by the defined edges are identified. The distinct non-overlapping regions of the first digital are combined based, at least in part, on a correspondence with the at least two dominant contiguous regions in the second digital image. Based, at least in part, on the remaining regions after combining the distinct non-overlapping regions of the first digital image, the initial digital image is segmented.

19 Claims, 9 Drawing Sheets

OTHER PUBLICATIONS

U.S. patent application Ser. No. 09/151,555, filed Sep. 11, 1998.

U.S. patent application Ser. No. 09/767,362 filed Dec. 18, 1996.

Wang,Demin; "A Multiscale Gradient Algorithm for Image Segmentation Using Watersheds," Communications Research Centre, 1997, pp. 2043–2052.

Wang, Demin and Labit, Claude, "Morphological Spatio–Temporal Simplificatin for Video Image Simplification," Signal Processing Image Communication, 1997, pp. 161–170.

Wang, Demin, "Unsupervised Video Segmentation Based on Watersheds and Temporal Tracking," IEEE Transactions on Circuits and Systems For Video Technology, vol. 8, No. 5, Sep. 1998.

* cited by examiner

METHOD FOR SEGMENTING A DIGITAL IMAGE

RELATED APPLICATION

This patent application is related to concurrently filed U.S. patent application Ser. No. 09/346,325, titled "Method for Reducing Shadows and/or Noise in a Digital Image" by F. Martins, filed Jul. 2, 1999, assigned to the assignee of the present invention and herein incorporated by reference.

BACKGROUND

1. Field

This disclosure relates to processing digital images and, more particularly, to segmenting a digital image.

2. Background Information

In digital image processing systems, a variety of forms of digital image processing operations are performed. At times, the entire image processing system, as well as its individual component operations, depends on the particular application. Nonetheless, a challenge in digital image processing systems at large is to successfully segment a digital image, e.g., to partition the image into a set of smaller and meaningful regions. This is desirable in a plethora of situations. For example, it may be desirable to use different methods to process, transmit or store the different regions of the image depending on the region contents. In video and image communications, if limited bandwidth and/or memory are available it may be interesting or desirable to dedicate more bits to represent the most relevant regions of the image according to some application specific interest metric. A commonly used interest metric in segmentation of such a digital image partitions the image so that regions corresponding to moving objects in the scene, referred to in this context as "foreground objects," are segmented or separated from the static "background" of the scene being imaged. Segmenting the image in this manner, also known as background/foreground segmentation, may be desirable in a host of possible applications. These include, but are not limited to, automated target acquisition and tracking, surveillance applications, navigation applications, gesture interpretation, video-based command and control, and computer games. A computer or similar computing platform may be used to execute such a segmentation method. Well-known segmentation methods based on edge detection generally fail to use the motion information that separates the foreground from the background. Methods that are based on computing a difference between a known shot of the background and the current video frame may produce artifacts known as false negatives (e.g., holes in the moving objects) and false positives (e.g., pieces of background merged with the foreground objects). Processes that are based on elaborate physical models for object dynamics may deliver better segmentation results, but often are too computationally intensive to perform in real-time. A need, therefore, exists for a method or technique for segmenting a digital image that improves upon the state of the art technology for real-time image segmentation.

SUMMARY

Briefly, in accordance with one embodiment of the invention, a method of segmenting an initial digital image includes the following. The initial digital image is processed to produce a first digital image with defined edges corresponding to the initial digital image and to produce a second digital image with at least two dominant contiguous regions corresponding to the initial digital image. Distinct non-overlapping regions of the first digital image formed by the defined edges are identified. The distinct non-overlapping regions of the first digital are combined based, at least in part, on a correspondence with the at least two dominant contiguous regions in the second digital image. Based, at least in part, on the remaining regions after combining the distinct non-overlapping regions of the first digital image, the initial digital image is segmented.

Briefly, in accordance with another embodiment of the invention, a method of removing at least some noisy pixels internal to one or more objects in a digital image includes the following. A sequence of one or more morphological openings and/or closings are applied in gradually increasing size. Then, a morphological closing with reduced erosion is applied, the erosion having a size larger than any of the one or more morphological openings and/or closings in the sequence.

BRIEF DESCRIPTION OF THE DRAWINGS

The subject matter regarded as the invention is particularly pointed out and distinctly claimed in the concluding portion of the specification. The invention, however, both as to organization and method of operation, together with objects, features and advantages thereof, may best be understood by reference to the following detailed description when read with the accompanying drawings in which:

DETAILED DESCRIPTION

In the following detailed description, numerous specific details are set forth in order to provide a thorough understanding of the invention. However, it will be understood by those skilled in the art that the present invention may be practiced without these specific details. In other instances, well-known methods, procedures, components and circuits have not been described in detail so as not to obscure the present invention.

As previously discussed, in a variety of environments or applications of digital image processing, it may be desirable to segment a foreground object or objects in a digital image from the background of the digital image. One aspect that may be included in such segmentation, although the invention is not limited in scope in this respect, comprises a process or technique in which shadows cast by the object or objects are reduced in, or even removed from, the digital image. Although the invention is not limited in scope in this respect, one such approach is described in the aforementioned concurrently filed patent application "Method of Reducing Shadows and/or Noise in a Digital Image." Of course, any other approaches to removing or reducing shadows in a digital image may be employed and are within the scope of the current invention. For example, in one approach, a difference image may be produced from a pixel-wise difference of an original digital image to be processed and a digital image containing what is believed to be the static background for that original digital image. In that difference image, pixel locations having pixel signal values in a certain predetermined range or at a certain predetermined level may be assumed to constitute shadows or noise. Therefore, the pixel signal values in the original digital image may be omitted to produce a difference-driven copy of the original digital image. Again, any one of a number of techniques may be employed here. For example, assume that a digital image comprising a selective copy of the input image is provided in which an attempt has been made to omit those pixels having particular signals values that correspond to shadows or noise in the original digital image, this selective copy produced by any desired technique. The following embodiment is in accordance with the present invention may be applied to such a digital image. Likewise, such a technique or embodiment in accordance with the invention may also be applied if no such attempt to reduce or remove shadowing and/or noise has been employed. Nonetheless, for the remainder of this patent application, it will be assumed that this particular embodiment in accordance with the present invention employs the embodiment described in the aforementioned concurrently filed patent application. Therefore, terminology provided in that patent application shall be employed consistently here, where appropriate, in describing this particular embodiment of the present invention.

Figure 9:
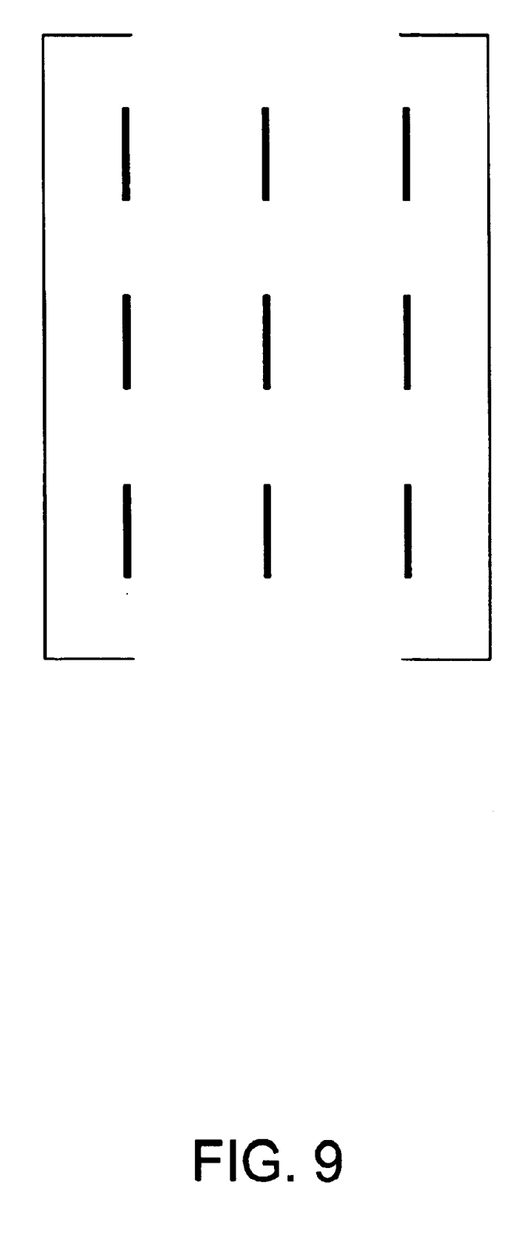
FIG. 9 is a table illustrating a matrix for a morphological operation applied for the embodiment of FIG. 1.

In this particular embodiment, after a technique has been employed to reduce shadows and/or some camera noise in the original digital image, such as the technique described in the aforementioned concurrently filed patent application, the following process or technique is applied to reduce and/or eliminate holes that may exist inside one or more objects. For example, such noisy pixels may have either been in the original image or may be generated as a result of the process of reducing shadows in the digital image. In this particular embodiment, a sequence of symmetric morphological operation pairs in gradually increasing size is applied to patch holes and reduce or eliminate spurious pixels. Those operation pairs comprise a morphological dilation operation (hereinafter referred to as "dilation") followed by a morphological erosion operation (hereinafter referred to as "erosion") with symmetric structuring elements, and vice-versa. The term symmetric structuring element refers to the shape of the structuring element that defines the morphological operation, such as a matrix, for example. It is noted that an operation pair having symmetric structuring elements comprising a dilation followed by an erosion is referred to as a morphological closing, whereas an operation pair having symmetric structuring elements comprising an erosion followed by a dilation is referred to as a morphological opening. Thus, in this particular embodiment, a 3×3 dilation, comprises a morphological dilation with a structuring element having a height and width of three pixels. Likewise, applying a sequence of symmetric morphological operation pairs in gradually increasing size, in this context, refers to applying at least one set of operation pairs after another, where the structuring elements of the matrix operator employed gradually increases, such as in width and/or height, with each applied operation pair. For example, in this particular embodiment, after the application of a 3×3 dilation followed by a 3×3 erosion, i.e., a 3×3 morphological closing, then a 5×5 erosion is applied, followed by a 5×5 dilation, i.e., a morphological opening. A sample matrix for this embodiment is provided in FIG. 9, although, of course, the invention is not restricted to this particular matrix. The matrix illustrated is a 3×3, although, for this embodiment, if, instead, a different size, such as a 5×5, for example, were applied, then the matrix would comprise all binary "ones" as well, but having a different shape. Note that in this particular embodiment, the order of the opposing operation pairs is reversed for the second pair of the sequence applied; however, the invention is not limited in scope in this respect. Furthermore, in this particular embodiment, a gradual increase in size includes an increase in two pixels in length and width; although, again, the invention is not limited in scope in this respect.

The application of the aforementioned sequence is employed to reduce or remove the amount of spurious isolated pixels, also known as "salt and pepper" noise, that may be included in the image, as well as small isolated groupings of pixels that may not be consistent with the surrounding pixels within the particular object. Then, in this particular embodiment, a third morphological operation pair is applied, both operations of the pair having a size larger than the preceding pair operations. Therefore, in this particular embodiment, a 13×13 dilation is applied followed by a 9×9 erosion. This is referred to in this context as a morphological closing with reduced erosion. Again, the matrices for this embodiment have the form of the matrix in FIG. 9, but of different shape. Furthermore, the invention is not limited in scope to this particular matrix or these particular shapes. However, in this particular embodiment, this may result in "patching" larger holes, or groupings of contiguous pixels not consistent with the rest of the surrounding image, than the previously applied morphological operations. Therefore, the resulting filtered image should have no, or substantially no, internal "holes," or groupings of pixels to be "patched." However, the resulting digital image may have lost local edge localization information with respect to the object or objects in the digital image. For example, for this particular embodiment, in which a 13×13 dilation is followed by a 9×9 erosion, an "aura" of about three or four pixels in dimension may be generated around the foreground object or objects because the applied erosion is smaller than the preceding dilation, that is, the morphological closing employs reduced erosion, as indicated above. This applied to a digital image is illustrated, for example, in FIG. 4. The foregoing result may be more desirable in some embodiments and less desirable in others. For example, if additional processing is to be applied, producing such an "aura" may be desirable. However, if, instead, the resulting image is to be used as a simpler method of segmentation, an "aura" is less desirable because edge localization is useful in a segmentation map. Likewise, it is, of course, noted that, although, in this particular embodiment, square morphological operations are being applied, the invention is not limited in scope in this respect.

Of course, morphological filters and/or operations are well-known. For example, they are described in the textbooks, *Digital Image Processing*(Chapter 11), by Dr. Bernd Jahne, published by Springer-Verlag, 3d Edition, 1995, and, *Mathematical Morphology in Image Processing*, edited by Edward R. Dougherty, published by Marcel Dekker, Inc., 1992. In this particular embodiment, sizes for the structuring elements that define the six morphological operations were chosen to respectively patch small holes, remove salt and pepper noise, and patch larger holes in the incoming difference image. Again, the invention is not limited in this respect. In this context, the previously described digital image processing applied, as previously described, to remove holes and noise from the difference image is referred to as a binary morphological filter.

Figure 1:
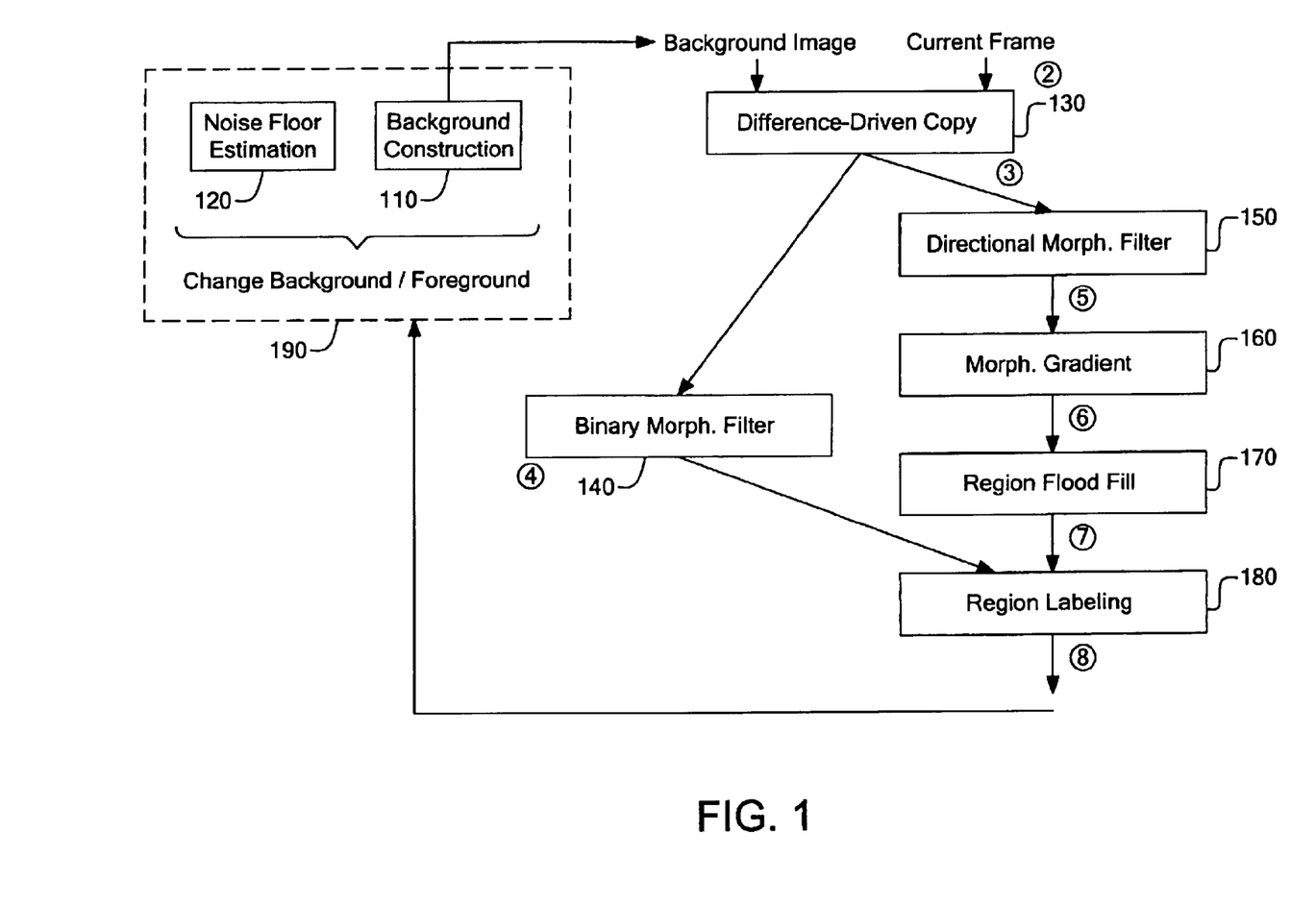
FIG. 1 is a block diagram illustrating an embodiment of a method for segmenting a digital image in accordance with the present invention.
Figure 2:
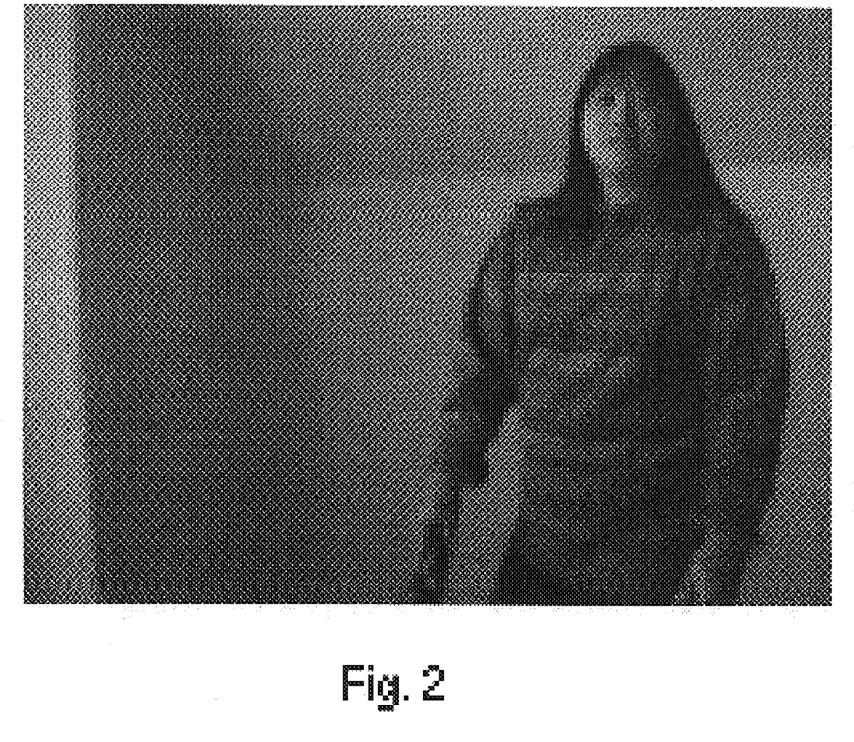
FIGS. 2–8 are digital images produced at various designated points of the block diagram of FIG. 1.
Figure 3:
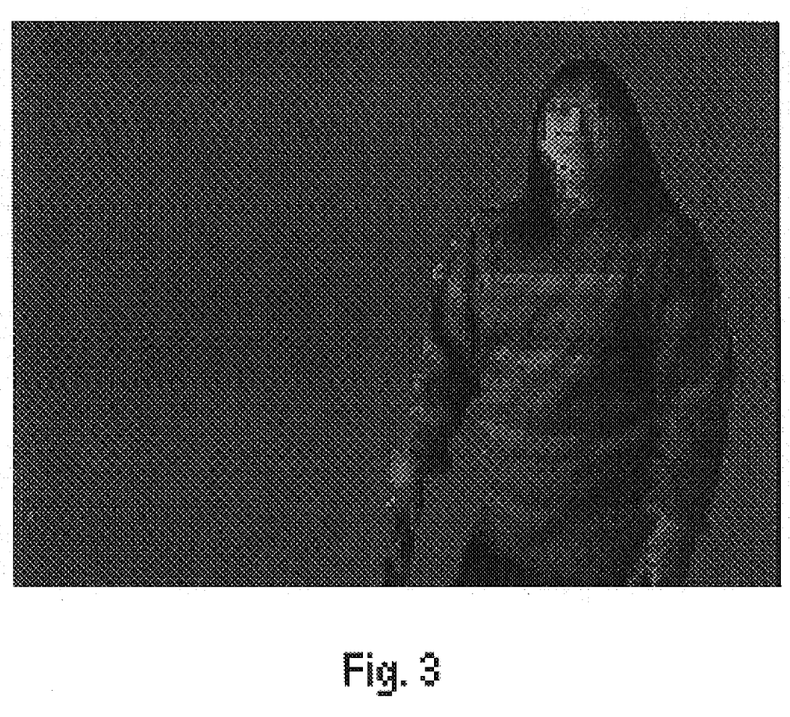
Figure 4:
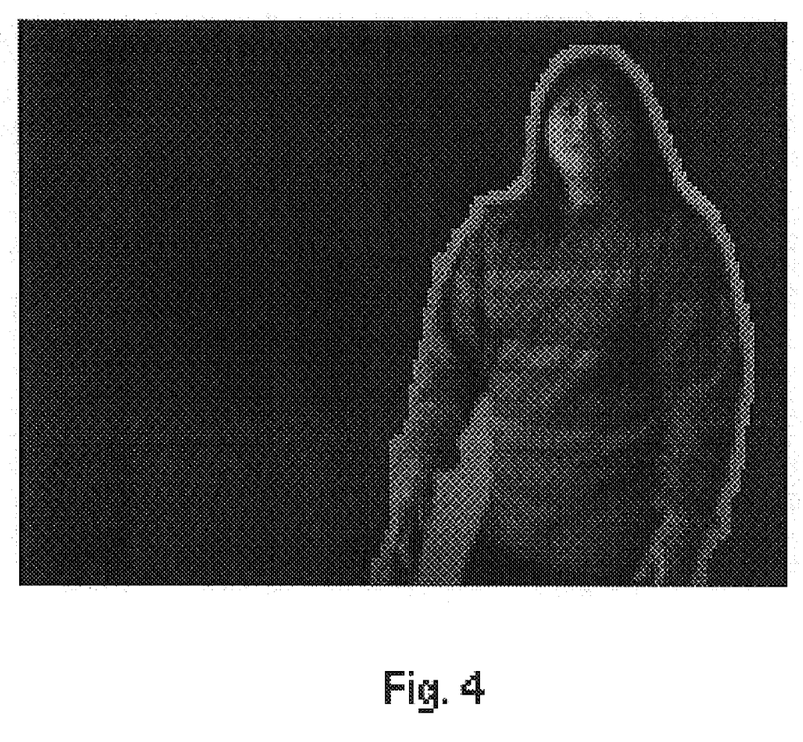

FIG. 2, in this example, is an original digital image to be processed; although the present invention is not limited in scope to being applied to original images prior to processing. FIG. 3, thus, illustrates an initial digital image, for this particular embodiment, that has been processed to reduce shadowing in accordance with the aforementioned concurrently filed patent application, although, as previously indicated, an embodiment may also exclude such processing. FIG. 1 is a block diagram illustrating an embodiment in accordance with the invention. The images of FIGS. 2–8 are produced at various points in an embodiment that conforms with the block diagram, and are designated as such in FIG. 1. FIG. 4, therefore, illustrates the digital image after this particular embodiment, as just described, has been applied to the initial digital image to remove at least some noisy pixels internal to the object in the digital image. In one embodiment in accordance with the invention, such as where greater processing efficiency is desired or where the processing power of the particular platform is limited, a digital image produced, by what is referred to in this context as the binary morphological filter, which is the process previously described, to remove at least some noisy pixels internal to the object, may be employed to segment the background and the foreground image without additional significant image processing. However, as previously indicated, in such an embodiment, the application of a 13×13 dilation followed by a 9×9 erosion may not be a preferred approach in some circumstances. Alternatively, it may be desirable that the structuring elements used for dilation and erosion be closer in size. Nonetheless, once the binary morphological filter has been applied, a resulting segmentation may be based, in whole or in part, on the edge separating the background portion of the image from the "aura" around the object, such as illustrated in FIG. 4, for example.

It is noted, of course, that the invention is not restricted in scope to employ this particular embodiment to produce a digital image having at least two dominant contiguous regions. For example, digital filtering techniques, such as low pass filtering, may be employed in an alternative embodiment. However, the previously described processing produces from an initial digital image a different digital image with at least two dominant contiguous regions. The number of dominant contiguous regions will relate to the number of objects in the foreground and their relationship. As described above, this latter digital image may be employed to segment the foreground and the background, however, the segmentation may be further refined, as described in more detail hereinafter. Of course, further refinement may involve employing additional processing power, so, depending on the environment, it may be more desirable to employ one approach or the other.

Another digital image may be produced, where this digital image includes defined edges corresponding to the initial digital image, such as FIG. 3. As shall be described in more detail hereinafter, the digital image including defined edges may be produced, in this particular embodiment, by applying to an initial digital image, such as the previously described digital image that was processed to remove noise and/or shadows, or, alternatively, an original image, a directional morphological filter. Then, a multi-scale morphological gradient may be computed. Both a directional filter and a multi-scale gradient will both be described in detail in the following paragraphs.

More specifically, in this particular embodiment, a directional morphological filter is applied to reduce details in the digital image for the gradient operation that will be applied later, as just described. In this embodiment, the directional morphological filter operates on YUV color space planes and uses morphological operations to fill blanks or holes in the image, such as those produced by reducing the shadows in the image, and to blur the internal details of the digital image without losing desired local edge signal information. Of course, any color space or even no color space, such as a gray scale, may be employed. In this embodiment, although the invention is not limited in scope in this respect, four directions are employed for the directional filter, horizontal, vertical, and two opposing diagonals. Of course, any number of directions, and, any set of different directions may be employed. For these particular directions, the matrix to be applied comprises a 5×1 matrix in this embodiment, although any M×1 matrix, for example, where M is a positive integer, may be applied. As previously indicated, for this embodiment, the matrix has the form shown in FIG. 9, where the matrix elements comprise a binary "one." Likewise, in this particular embodiment, for each of these directions, the four morphological operations applied comprise a sequence of morphological operations. Thus, in this particular embodiment, for example, the sequence of operations to be applied comprises, in sequence, a dilation, an erosion, an erosion, and a dilation. Of course, the invention is not limited to a particular sequence of operations. It is noted that this particular sequence is "balanced" between dilation and erosion operations and that the reverse sequence, that is where the order of operations from beginning to end is reversed, is identical, although the invention is not limited in scope in this respect. In this embodiment, these operations are applied for each of the four directions independently and the four independent directional results are then combined into a single image by taking the maximum signal value in each corresponding pixel location of the four images produced by applying these operations. Of course, in an alternative embodiment, images produced using directional morphological filters may be combined differently, such as other than by employing the maximum signal value in corresponding pixel locations of the resulting images. For example, if the final operation were an erosion, it would be convenient to employ the minimum signal value rather than the maximum.

Figure 5:
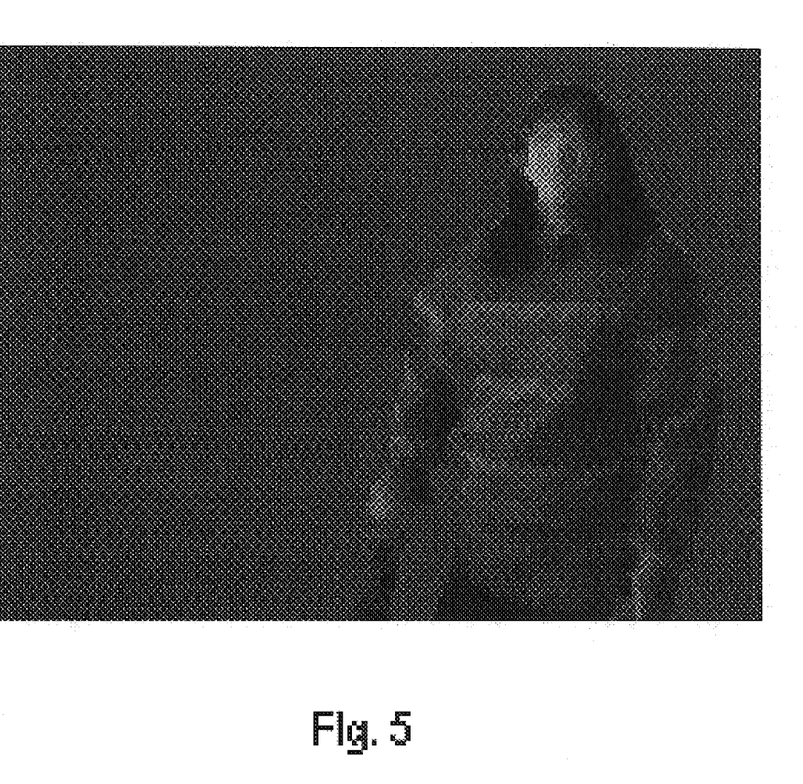

FIG. 5 illustrates the resulting image from the application of this particular embodiment. As illustrated, a blurred version of the digital image is produced, although local edge signal information has been preserved, unlike traditional non-adaptive averaging filters that, being "symmetric," blur across the edges. Here, in contrast to previously, the term "symmetric" refers to the notion that the same result is obtained if the order in which the operations are applied is reversed. For the image shown in FIG. 5, a few holes or blanks remain in the foreground object or objects, but these aspects of the digital image produced shall be addressed by later processing, as shall be described in more detail hereinafter.

After the application of the directional morphological filter, a sequence of morphological gradient operations using distinct structuring element sizes is applied. Ultimately, these operations will make it possible to extract a silhouette of the foreground object or objects from the digital image. A multi-level morphological gradient is employed to identify the edges of the image objects generated by the directional morphological filter, such as the embodiment previously described. This is then followed by a silhouette enhancement procedure, as described in more detail hereinafter. In this context, a morphological gradient with a structuring element of size K is defined as the difference between application to an input image, I, of a dilation operation followed by an erosion operation with a structuring element of size K, followed by an erosion operation with the structuring element of size K−1. This may be denoted symbolically as follows:

$$MG(I,K) = E\{[D(I,K) - E(I,K)], K-1\} \qquad [1]$$

where MG(I,K) denotes a morphological gradient applied to image I with structure element size K; E(I,K) denotes a morphological erosion applied to image I with structure element size K; D(I,K) denotes a morphological dilation applied to image I with structure element size K; and a minus sign denotes a pixel-wise difference between two images. Likewise, a multi-scale or multilevel morphological gradient in this context is a normalized summation of a sequence of morphological gradients with distinct structuring element sizes. In this embodiment, the summation is normalized to keep the values of gradient within the 0 to 255 range of an 8 bit per pixel image, although, of course, the invention is not limited in scope in this respect. In this particular embodiment, the size K=1 (3×3), K=2 (5×5), and K=3 (7×7) structuring elements are employed to generate the following relationship:

$$MMG(I)=MG(I,1)+MG(I,2)+MG(I,3) \qquad [2]$$

where MMG(I) denotes the multiscale morphological gradient of image I, and a plus sign denotes a pixel-wise sum of images. Although the invention is not limited in scope to this particular embodiment, empirical results indicate that these morphological gradients produce "cleaner" results than application of, for example, a Sobel gradient. Nonetheless, alternative embodiments may be employed and are within the scope of the present invention. Therefore, a sequence of edge detection and low pass filtering operations, such as are employed in digital filtering, for example, may, alternatively, be employed. Furthermore, although in this particular embodiment, the sequence of gradient operations are increased by two pixels and the sequence of operations begins with a 3×3 morphological operation, the invention is not limited in scope in this respect.

Figure 6:
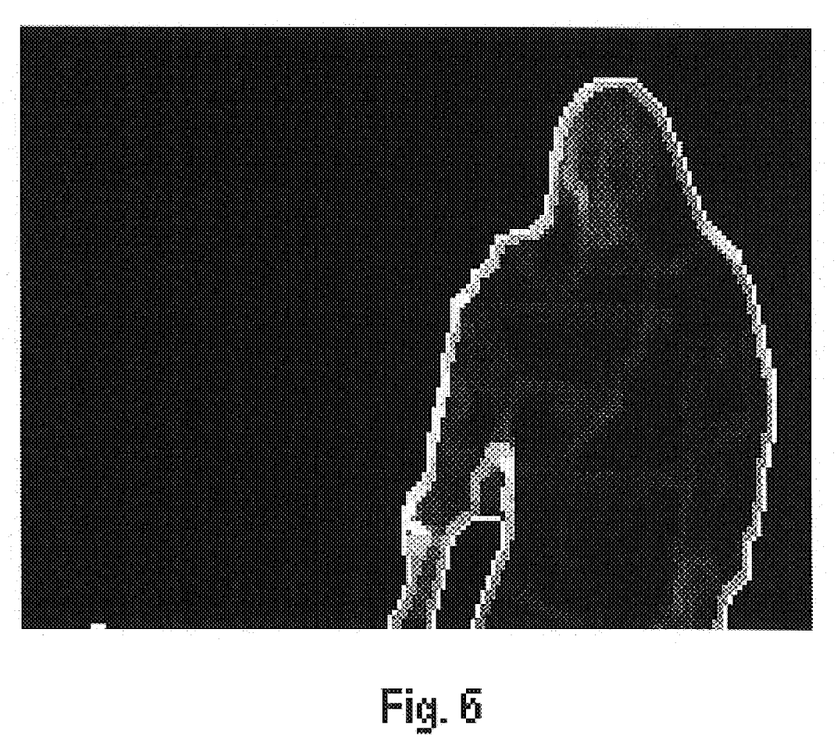

In the embodiment, silhouette enhancement is then applied as post-processing to the multiscale morphological gradient operation. For all non-zero pixels in the gradient map or image, in this embodiment, the immediately adjacent neighbors of the non-zero pixel are checked. If any are zero, the value of the gradient is brought up to 255 in this embodiment, which is the maximum allowable value where eight bits per pixel are employed. FIG. 6 illustrates the result of applying the multi-level morphological gradient operation followed by the silhouette enhancement technique, in this embodiment.

Figure 7:
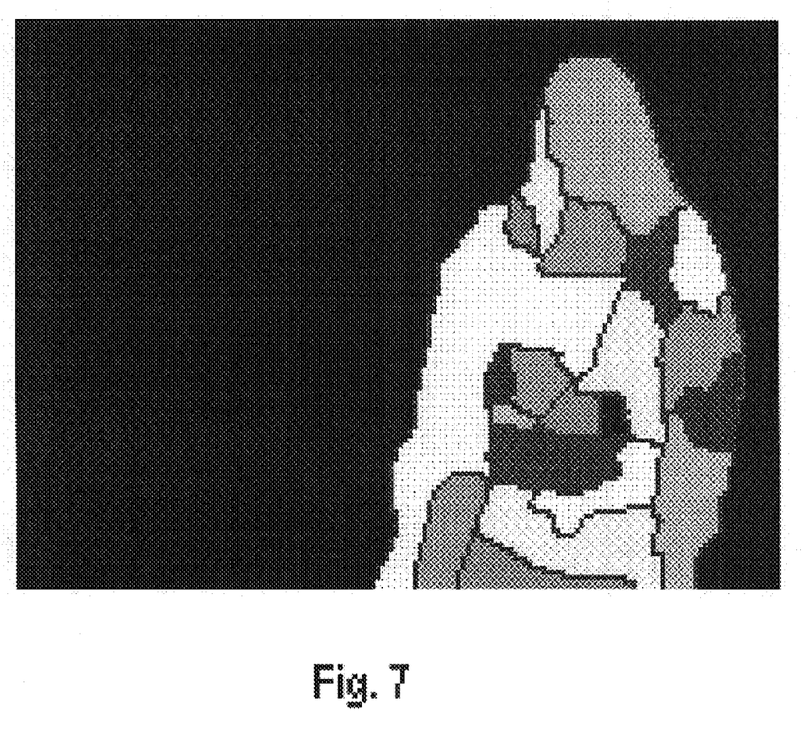

Therefore, the result of the immediately preceding operations, for this particular embodiment, is a processed digital image with defined edges corresponding to the initial digital image, although, as previously indicated, other filtering approaches may be employed to produce such an image with defined edges. Once this processed digital image has been produced, such as illustrated in FIG. 6, distinct, non-overlapping regions of the image formed by the defined edges may be identified. In this particular embodiment this is accomplished by using a "region flood fill process." Region flood fill processes are well-known in the art and may take a variety of forms. The invention is not limited in scope to any particular region flood fill process. To identify, for all pixels in the image, the particular distinct region to which that pixel belongs, in this embodiment, the image is "painted," using a different color for each region. In this embodiment, a region flood fill process is recursively accessed or "called," such as where the process is implemented with software, each time a new region is identified. Such processes are well-known and included in most graphical editors that execute on a computing platform, for example. To identify a "seed" inside each region of the image, the image is scanned in lexicographic order looking for "non-flooded" pixels, although the invention is not limited in scope to scanning in lexicographic order. Upon encountering a non-flooded pixel, a new color is chosen and the flood fill process is "called" or accessed for that region, using white as the boundary color for the region, in this particular embodiment. Once the region is "flooded," this process is then resumed to locate new non-flooded regions by identifying a non-flooded pixel, again in lexicographic order in this particular embodiment, until the end of the image is encountered. FIG. 7 illustrates the results of such a process. A region flood fill process, likewise, may, as here, track the number of regions identified and the number of pixels per region.

Figure 8:
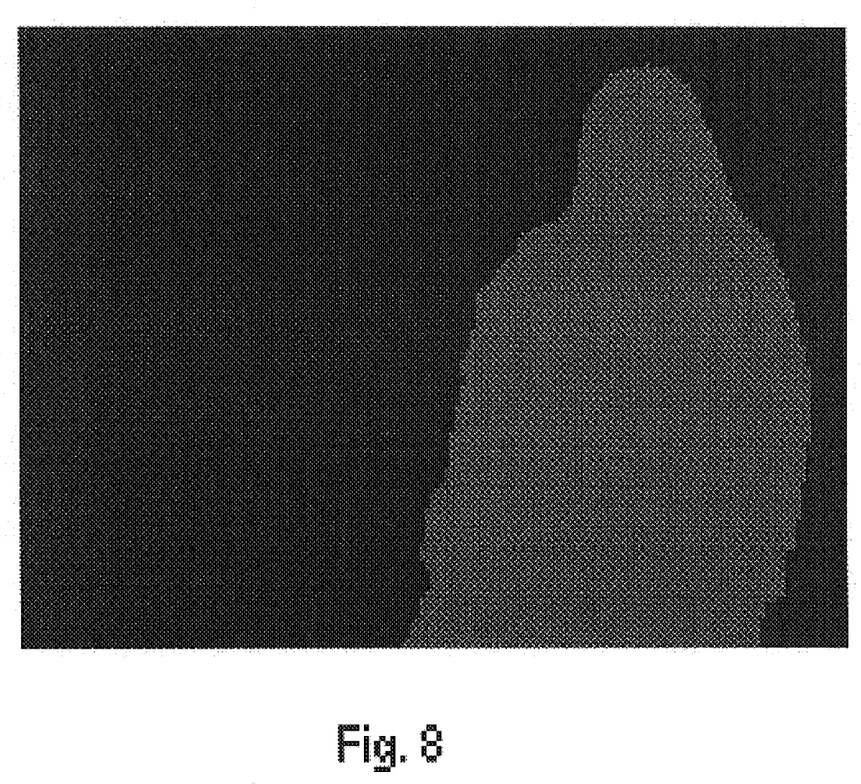

Once distinct non-overlapping regions have been identified, these regions are combined. This combining of regions or region labeling is based on the clustering of the regions in two or more classes using cues extracted from the image. In particular, each of the previously identified regions in the image with defined edges will be selected or labeled as either in the foreground or the background, boundaries between regions labeled similarly are removed thereby generating a foreground/background binary map in which the remaining edge or edges separate the foreground and the background. The number of remaining edges, and, hence, remaining distinct regions, may depend, at least in part, on the number of objects. These remaining distinct regions represent the foreground and the background. Therefore, this image or map, in this particular embodiment, forms the final segmentation map. Region labeling, in this embodiment, employs the image produced by the binary morphological filter to determine, for each pixel, whether that pixel belongs to the foreground or background. For every identified, distinct region, the fraction of pixels that are believed to be foreground pixels is computed. If the fraction of pixels believed to be foreground pixels for a particular region is large enough, defined by a threshold, such as, in this particular embodiment 60%, the entire distinct non-overlapping region is labeled as part of the foreground. It is noted, of course, that the invention is not limited in scope to a particular threshold value in this regard. It is also noted that, in this particular embodiment, the region labeling procedure results in combining the outcome of the two filtering processes previously described, namely the binary morphological filter process and the directional morphological filter process. As previously indicated, the former has "hole patching" capability, while the latter has the capability to "blur internal details" while retaining edge localization information. The final segmentation for this example is illustrated in FIG. 8.

One aspect of the embodiment of a method of reducing shadows and/or noise in a digital image, described in the aforementioned concurrently filed patent application, is that the illumination and background are assumed to be static. A similar assumption applies to the previously described embodiment of the present invention. If the background or illumination changes, or other aspects change, such as camera angle, etc., then it may be desirable that the background image be reinitialized, such as described, for example, in the aforementioned concurrently filed patent application to initialize the background image. Therefore, another noise floor estimate may be determined, etc., using images in which the illumination or background, for example, has changed.

However, in yet another embodiment in accordance with the present invention, changes in the background and/or illumination may be adaptively supported, e.g., reinitializing may be avoided by adaptive modification of the background and foreground. In such an embodiment, using, for example, the previously described filtering techniques, pixel locations of the background that have changed in pixel signal value by a measurable amount, such as, for example, above a threshold value, may be identified and processed as a portion of an object, or as another object, in arriving frames. Likewise, an object, or portions thereof, which has not changed, such as beyond a measurable amount within such a threshold level, may be identified and processed as a portion of the background in arriving frames. Thus, through such a mechanism, the background model and noise floor estimates may be implemented, in this embodiment, as a dynamic mosaic and a set of adaptive thresholds that support the described changes.

It is, likewise, noted that one advantage of this particular embodiment in accordance with the invention is that it may be executed efficiently by a processor or similar device that specifically employs a single instruction, multiple data (SIMD) architecture, or the equivalent. Due, at least in part, to the nature of the operations being performed, such as morphological operations, it is relatively convenient to perform many parallel operations at once on multiple pixel signal values using a signal instruction. In particular, signal values for pixels for an entire row and column operation on the image may be processed substantially simultaneously with a single instruction. Therefore, a digital image may be processed relatively quickly. For example, for the particular embodiments previously described, image segmentation may be performed on a Pentium® III processor for a 160×120 video on a frame-by-frame basis at 30 frames per second (fps). This is typically not possible using other segmentation approaches, and is even more impressive, in particular, for an approach that produces good results, such as this particular embodiment.

As previously indicated, many alternative embodiments of the present invention are possible. For example, as previously described, one embodiment includes a method of segmenting an image. Likewise, an alternative embodiment may include a storage medium, such as, for example, a hard drive, compact disk, or diskette, which has stored instructions thereon, that, when executed, such as by a computing platform, for example, result in a digital image being segmented, such as in a manner in accordance with the present invention, or result in at least some noisy pixels internal to one or more objects in a digital image being removed, such as in a manner in accordance with the present invention. Furthermore, another alternative embodiment may include, for example, an apparatus for processing digital images. Such an embodiment may include, for example, a computing platform, such as a settop box, a personal computer, a desktop or a laptop computer. In addition, such a computing platform may include a storage medium, such as described above, that has stored instructions thereon, that when executed by the computing platform, result in a digital image being segmented, such as in a manner in accordance with the invention, or result in at least some noisy pixels internal to one or more objects in a digital image being removed, such as in a manner in accordance with the present invention.

While certain features of the invention have been illustrated and described herein, many modifications, substitutions, changes, and equivalents thereof will now occur to those skilled in the art. It is, therefore, to be understood that the appended claims are intended to cover all such modifications and changes as fall within the true spirit of the invention.

What is claimed is:

1. A method of segmenting an initial digital image comprising:

processing an initial digital image to produce a first digital image with defined edges corresponding to the initial digital image and a second digital image with at least two dominant contiguous regions corresponding to the initial digital image;

identifying distinct, non-overlapping regions of the first digital image formed by the defined edges;

combining the distinct, non-overlapping regions based, at least in part, on a correspondence with the at least two dominant contiguous regions of the second digital image; and segmenting the initial digital image based, at least in part, on the remaining regions after combining the distinct, non-overlapping regions based, at least in part, on the correspondence with the at least two dominant contiguous regions.

2. The method of claim 1, wherein one segmentation comprises the background of the initial digital image.

3. The method of claim 2, wherein the remaining segmentation comprises the foreground of the initial digital image.

4. The method of claim 3, and further comprising segmenting additional digital images after said initial digital image.

5. The method of claim 4, wherein segmenting additional digital images after said initial digital image comprises: determining the pixel locations in the background segmentation that have changed a measurable amount in pixel signal value and processing those pixel locations as in the foreground segmentation.

6. The method of claim 4, wherein segmenting additional digital images after said initial digital image comprises: determining the pixel locations in the foreground segmentation that have not changed by an amount in pixel signal value that is specifically measurable and processing those pixel locations as in the background segmentation.

7. The method of claim 1, wherein identifying the distinct, non-overlapping regions comprises applying a region flood fill process.

8. The method of claim 7, wherein said region flood fill process comprises:

identifying a non-flooded pixel in the first image;

flood filling the distinct, non-overlapping region including the non-flooded pixel; and continuing the immediately preceding identifying and flood filling operations until the first image contains no non-flooded pixels.

9. The method of claim 1, wherein processing the initial digital image to produce the first image comprises:

applying a directional morphological filter;

applying a sequence of multilevel morphological gradient operations; and summing the sequence.

10. The method of claim 9, wherein applying the directional morphological filter comprises:

applying a balanced sequence of opposing morphological operations in a plurality of independent directions.

11. The method of claim 10, wherein the balance sequence of morphological operations in reverse is identical to the non-reversed sequence.

12. The method of claim 11, wherein the plurality of independent directions comprise: a vertical direction, a horizontal direction and two opposing diagonal directions.

13. The method of claim 11, wherein the balanced sequence comprises: a dilation operation, an erosion operation, an erosion operation, and a dilation operation.

14. The method of claim 9, wherein the sequence of multilevel operations is gradually increasing.

15. The method of claim 14, wherein the sequence of operations is increasing by two pixels in matrix width and height.

16. The method of claim 15, wherein the sequence of operations begins with an operation having a 3×3 matrix operator.

17. An article comprising: a storage medium;

said storage medium having stored thereon instructions to segment an initial digital image, said instructions, when executed by a computing platform, resulting in:

processing the initial digital image to produce a first digital image with defined edges corresponding to the initial digital image and a second digital image with at least two dominant contiguous regions corresponding to the initial digital image;

identifying distinct, non-overlapping regions of the first digital image formed by the defined edges;

combining the distinct, non-overlapping regions based, at least in part, on a correspondence with the at least two dominant contiguous regions of the second digital image; and segmenting the initial digital image based, at least in part, on the remaining regions after combining the distinct, non-overlapping regions based, at least in part, on the correspondence with the at least two dominant contiguous regions.

18. The article of claim 17, wherein said instructions, when executed, resulting in:

segmenting additional digital images after said initial digital image by determining the pixel locations in a background segmentation that have changed a measurable amount in pixel signal value and processing those pixel locations as in a foreground segmentation.

19. The article of claim 17, wherein said instructions, when executed, resulting in:

segmenting additional digital images after said initial digital image by determining the pixel locations in a foreground segmentation that have not changed an amount in pixel signal value that is specifically measurable and processing those pixel locations as in a background segmentation.

* * * * *